United States Patent
Kim

(10) Patent No.: US 10,085,215 B2
(45) Date of Patent: Sep. 25, 2018

(54) PORTABLE DEVICE FOR ADAPTIVE DATA COMMUNICATION CONTROL AND METHOD OF OPERATING THE SAME

(71) Applicant: Samsung Electronics Co., Ltd., Suwon-si, Gyeonggi-do (KR)

(72) Inventor: Jin Yup Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 14/167,241

(22) Filed: Jan. 29, 2014

(65) Prior Publication Data

US 2014/0148226 A1    May 29, 2014

Related U.S. Application Data

(63) Continuation of application No. 13/267,209, filed on Oct. 6, 2011, now Pat. No. 8,670,806.

(30) Foreign Application Priority Data

Oct. 15, 2010 (KR) .................... 10-2010-0101065

(51) Int. Cl.
*H04W 52/02* (2009.01)
(52) U.S. Cl.
CPC ......... *H04W 52/0251* (2013.01); *Y02D 70/00* (2018.01); *Y02D 70/1222* (2018.01); *Y02D 70/1242* (2018.01); *Y02D 70/166* (2018.01)
(58) Field of Classification Search
CPC ........... H04W 52/0251; H04W 52/027; H04W 52/0267; H04W 52/02; H04W 52/0229; H04W 52/0225; H04W 76/048; H04W 76/04; H04W 76/046; H04W 76/02; H04W 76/068
USPC .............. 455/574, 450–453, 566, 41.1–41.3; 345/212
See application file for complete search history.

(56) References Cited

U.S. PATENT DOCUMENTS

| | | |
|---|---|---|
| 2004/0179490 A1* | 9/2004 | Jang et al. ..................... 370/328 |
| 2008/0220829 A1 | 9/2008 | Akama et al. |
| 2009/0028084 A1* | 1/2009 | Ping .............................. 370/311 |
| 2009/0129339 A1 | 5/2009 | Young et al. |
| 2010/0118752 A1* | 5/2010 | Suzuki ............... H04W 76/048 370/311 |
| 2010/0173679 A1 | 7/2010 | Moon |
| 2010/0232331 A1 | 9/2010 | Son et al. |
| 2010/0302957 A1* | 12/2010 | Ketheesan et al. ........... 370/252 |

(Continued)

FOREIGN PATENT DOCUMENTS

| | | |
|---|---|---|
| EP | 2 134 035 A1 | 12/2009 |
| JP | 2009-284186 A | 12/2009 |

(Continued)

*Primary Examiner* — Daniel Lai
(74) *Attorney, Agent, or Firm* — Jefferson IP Law, LLP

(57) ABSTRACT

A portable device and a method of operating a portable device for performing adaptive data communication control are provided. The method includes determining the on or off state of a display unit, extracting data communication setting information including a fast dormancy policy according to the on or off state of the display unit, and controlling a data communication setting with a specific service provider network based on the extracted data communication setting information, and a portable device supporting the method.

16 Claims, 3 Drawing Sheets

(56) References Cited

U.S. PATENT DOCUMENTS

2010/0322127 A1\* 12/2010 Nakajima ................. 370/311
2011/0038347 A1\* 2/2011 Patil et al. ................ 370/331
2011/0319064 A1 12/2011 Lenart et al.
2012/0050152 A1\* 3/2012 Salminen et al. ........... 345/156

FOREIGN PATENT DOCUMENTS

| JP | 2009-296613 A | 12/2009 |
|----|---------------|---------|
| KR | 10-2010-0086040 A | 7/2010 |
| KR | 10-2010-0102250 A | 9/2010 |

\* cited by examiner

PORTABLE DEVICE FOR ADAPTIVE DATA COMMUNICATION CONTROL AND METHOD OF OPERATING THE SAME

PRIORITY

This application is a continuation application of a prior application Ser. No. 13/267,209, filed on Oct. 6, 2011, which claimed the benefit under 35 U.S.C. § 119(a) of a Korean patent application filed on Oct. 15, 2010 in the Korean Intellectual Property Office and assigned Serial No. 10-2010-0101065, the entire disclosure of which is hereby incorporated by reference.

BACKGROUND OF THE INVENTION

1. Field of the Invention

The present invention relates to a portable device. More particularly, the present invention relates to a portable device for performing adaptive data communication control and a method of operating a portable device.

2. Description of the Related Art

Portable devices that provide a variety of functions are becoming popular. Typical examples of such a portable device include a mobile communication portable device and a Personal Digital Assistant (PDA). The mobile communication portable device has a module for supporting a mobile communication function mounted thereon and supports the transmission and reception of voice and data to and from other mobile communication portable devices using a base station. Furthermore, the PDA is equipped with a Central Processing Unit (CPU), a memory, an Operating System (OS), a variety of programs based on the OS, and various elements. The PDA supports functions, such as information gathering, storage, writing, and searching, on the basis of the elements. As described above, the conventional portable devices support the mobile communication function or support specific user functions on the basis of various programs stored in storage units.

The conventional portable device complies with a data communication setting supported by a relevant network when it performs a communication function using network resources. The data communication setting includes a setting in which a portable device accesses a network and resources are allocated to the portable device and a setting in which allocated resources are released. However, the data communication setting is problematic in that it is fixed after the booting of the portable device is finished. Accordingly, there is a problem in that unnecessary current consumption according to the fixed Radio Resource Control (RRC) release method occurs because communication is performed in accordance with only the specific data communication setting irrespective of a change in the environment in which the portable device is operating.

SUMMARY OF THE INVENTION

Aspects of the present invention are to address at least the above-mentioned problems and/or disadvantages and to provide at least the advantages described below. Accordingly, an aspect of the present invention is to provide a portable device for performing adaptive data communication control and a method of operating a portable device, wherein a fast dormancy policy can be differentially applied according to the state of a display unit of the portable device.

Another aspect of the present invention is to provide a portable device for performing adaptive data communication control and a method of operating a portable device, which are capable of optimizing power consumption by performing more appropriate network Radio Resource Control (RRC) release on the basis of a data communication setting according to a portable device condition.

In accordance with an aspect of the present invention, a portable device for performing adaptive data communication control is provided. The portable device includes a display unit for switching on or off according to whether power is supplied, a storage unit for storing a data communication setting information including a fast dormancy policy for the switching of the display unit, and a controller for controlling the data communication setting with a specific service provider network according to the switching of the display unit based on the data communication setting information.

In accordance with another aspect of the present invention, a method of operating a portable device for performing adaptive data communication control is provided. The method includes determining the on or off state of a display unit, extracting data communication setting information including a fast dormancy policy according to the on or off state of the display unit, and controlling a data communication setting with a specific service provider network based on the extracted data communication setting information.

In accordance with a portable device for performing adaptive data communication control and a method of operating the same according to the exemplary embodiments of the present invention, the present invention can support a determination of a fast dormancy policy according to the conditions of a portable device.

Furthermore, exemplary embodiments of the present invention support optimum power consumption through RRC release according to an adaptive policy determination.

Furthermore, exemplary embodiments of the present invention can optimize a user function operation in a portable device according to adaptive RRC release.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
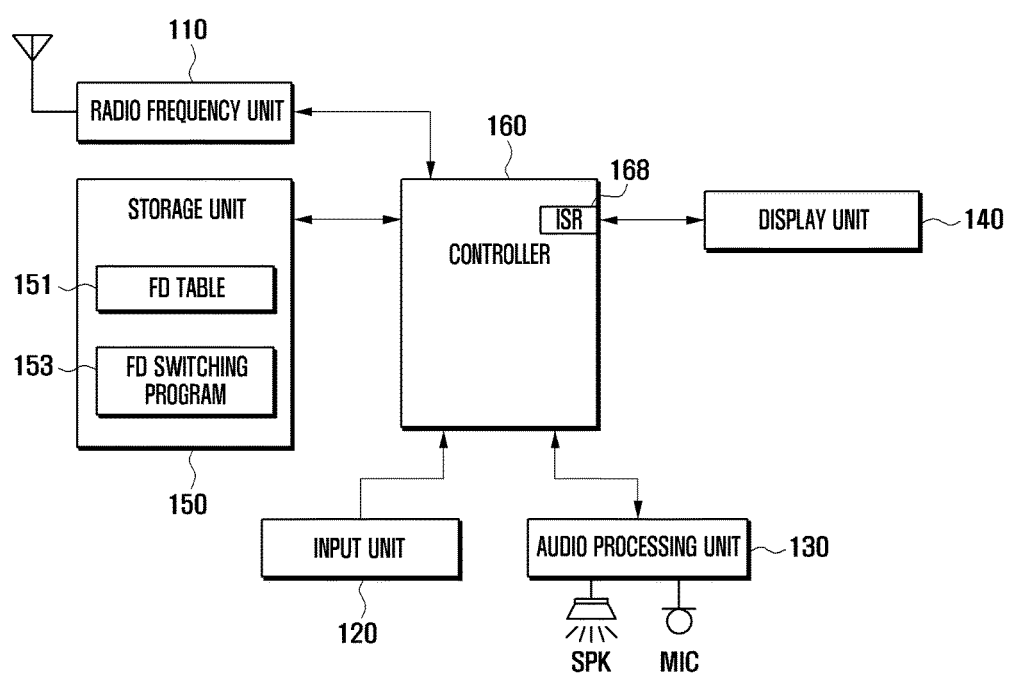
FIG. 1 is a block diagram showing a configuration of a portable device for performing adaptive data communication control according to an exemplary embodiment of the present invention.

FIG. 1 is a block diagram showing a configuration of a portable device for performing adaptive data communication control according to an exemplary embodiment of the present invention.

Referring to FIG. 1, the portable device includes a radio frequency unit 110, an input unit 120, an audio processing unit 130, a display unit 140, a storage unit 150, and a controller 160. The portable device may further include a subscriber module (e.g., a Subscriber Identity Module (SIM)) for supporting an individual portable device operation.

The portable device performs a data communication setting related to fast dormancy differently according to the turn-on state or the turn-off state of the display unit 140, so that power can be efficiently used on the basis of the data communication setting according to a situation in which the portable device is used in real time. Each of the elements of the portable device is described in more detail below.

The radio frequency unit 110 forms a communication channel for a voice call, sends images or pictures, and forms a communication channel for data transmission under the control of the controller 160. That is, the radio frequency unit 110 forms a voice call channel, a data communication channel, and a video telephony channel with a service provider network. To this end, the radio frequency unit 110 may include a radio frequency transmitter for performing up-conversion and amplification for the frequency of a transmitted signal, a radio frequency receiver for performing low-noise amplification and down-conversion for the frequency of a received signal, and so on. Here, the data communication channel may include a communication channel for video telephony, a communication channel for an instant message service, a communication channel for a chatting service, a communication channel for data transmission and downloading, etc. More particularly, the radio frequency unit 110 can establish a communication connection with a specific service provider network and perform a Radio Resource Control (RRC) release on the basis of a data communication setting which is changed under the control of the controller 160 according to the condition of the display unit 140. For example, when the display unit 140 is in the turn-on state, the radio frequency unit 110 may be operated on the basis of a first data communication setting in which RRC release is performed based on a first timer. When the display unit 140 is in the turn-off state, the radio frequency unit 110 may be operated on the basis of a second data communication setting in which RRC release is performed based on a second timer.

The input unit 120 includes a plurality of input keys and function keys for receiving number or character information and for setting various functions. The function keys may include direction keys, side keys, hot keys, etc. which are set to perform specific functions. Furthermore, the input unit 120 generates key signals which are received in regard to user setting and control of the functions of the portable device and sends the key signals to the controller 160. More particularly, the input unit 120 can generate an input signal for operating a specific user function, an input signal for supplying power to the display unit 140, etc. and transfers the generated input signals to the controller 160. In order to generate the input signal for supplying power to the display unit 140, a user may press a specific button included in the input unit 120 or may press a button corresponding to a function for activating a specific user function.

The audio processing unit 130 includes a speaker (SPK) for playing audio signals generated when specific content is played and audio signals transmitted and received after a communication channel is formed and a microphone (MIC) for gathering a user's voice or other audio signals. More particularly, the audio processing unit 130 can generate a guidance voice according to the turn-on or turn-off state of the display unit 140 and a guidance voice pertinent to a data communication setting which is changed according to the state of the display unit 140. The output of the guidance voice may be provided as an option function and may be omitted according to a designer's intention or deactivated according to a user setting.

The display unit 140 displays information input by a user and information provided to a user in addition to various menus provided by the portable device. That is, the display unit 140 can provide a variety of screens (e.g., a standby screen, a menu screen, a message writing screen, a call screen, and the like) according to the use of the portable device. The display unit 140 may be formed of a flat display device, such as a liquid crystal display and Organic Light Emitted Diodes (OLEDs), or a display device to which thin film transistor devices have been applied. Furthermore, if the display unit 140, together with a touch panel, is fabricated in the form of a touch screen, the display unit 140 can perform a function as an input unit. More particularly, the display unit 140 can output an access screen for displaying access to a specific service provider network when a communication function is operated, an access screen for displaying access to a specific server associated with a specific service provider network, a function screen for performing data communication with other portable devices on the basis of service provided by a relevant server, and so on. The supply of power to the display unit 140 may be stopped or started according to a user setting or under the control of a user. That is, when a user generates an input signal in order to perform a specific user function or activates a specific user function, the display unit 140 may be supplied with power in order to support the input signal and the activation of the user function. Accordingly, the display unit 140 can maintain the turn-on state. Furthermore, if an additional input signal is not generated or a user function for the supply of power is not activated for a certain period of time, the supply of power to the display unit 140 may be stopped after a lapse of some time according to a user setting. Here, the supply of power to the display unit 140 may be restricted step by step.

For example, if an input signal is not generated or a user function for the supply of power is not activated for a certain period of time, the display unit 140 may be supplied with less power than previously supplied. Furthermore, if a condition for the supply of power is not satisfied for a certain period of time after low power is supplied, the supply of power to the display unit 140 may be stopped. Meanwhile, the display unit 140 may output an icon or indicator, indicating that a fast dormancy policy is being applied, to a certain region. Here, information about the fast dormancy policy may include fast dormancy on or off information and timing information for releasing RRC when the portable device performs data communication with a service provider network.

The storage unit 150 stores an application program for supporting a call service and an application program for operating a specific SIM 170 accessing a SIM card interface, in addition to application programs for operating functions according to an exemplary embodiment of the present invention. The storage unit 150 may chiefly include a program region and a data region.

The program region stores an Operating System (OS) for booting the portable device and application programs necessary for other option functions (e.g., a sound play function, an image or video play function, and the like) of the portable device. Meanwhile, if a specific SIM is applied to the portable device, the OS can determine whether the SIM has been inserted into the SIM card interface when the portable device is booted and perform a mobile communication service routine designed to support mobile communication service based on the inserted SIM. More particularly, the program region can store a Fast Dormancy (FD) switching program 153 for changing a data communication setting according to the state of the display unit 140.

The FD switching program 153 is loaded into the controller 160 during a booting process and configured to support a change of the fast dormancy policy according to the state of the display unit 140. To this end, the FD switching program 153 may include a routine for determining the state of the display unit 140 and a selection routine for selecting a specific data communication setting (i.e., the fast dormancy policy) according to the state of the display unit 140. The selection routine may include a sub-routine for determining an FD table 151 stored in the storage unit 150 and selecting a first fast dormancy policy corresponding to a first data communication setting, from among pieces of data communication setting, when the display unit 140 is in the turn-on state as a result of the determination and a sub-routine for determining the FD table 151 stored in the storage unit 150 and selecting a second fast dormancy policy corresponding to a second data communication setting, from among the pieces of data communication setting, when the display unit 140 is in the turn-off state as a result of the determination.

The data region is a region in which data generated when the portable device is used is stored. The data region can store pieces of information, corresponding to data recorded by a user when a call is performed, user data (e.g., the above-described video) related to a variety of option functions provided by the portable device, phonebook data, audio data, relevant content, user data, and the like. More particularly, the data region may store the FD table 151. The FD table 151 includes information about a fast dormancy policy according to each state of the display unit 140. In other words, the FD table 151 may include first fast dormancy setting information applied to a data communication setting when the display unit 140 is in the turn-on state and second fast dormancy setting information applied to a data communication setting when the display unit 140 is in the turn-off state. The fast dormancy setting information may include fast dormancy on/off information, parameter information about the time when RRC release will be performed when the fast dormancy is provided (e.g., release in 2 to 5 seconds after a specific signal is transmitted or received), and so on.

The controller 160 controls the supply of power to each of the elements of the portable device so that a reset process is performed. When the reset process is finished, the controller 160 can support a change of data communication setting based on the display unit 140 according to an exemplary embodiment of the present invention for each of the elements of the portable device. To this end, the controller 160 can obtain information about the turn-on state or the turn-off state of the display unit 140 on the basis of an Interrupt Service Routine (ISR) 168 and control a change of the data communication setting based on the obtained information. The configuration of the controller 160 will be described in more detail later with reference to FIG. 2.

Meanwhile, the SIM that may be included in the portable device may be implemented in the form of an Integrated Circuit (IC) card and may be mounted on a variety of portable devices supporting a mobile communication service. The SIM includes a region for storing subscriber information. Accordingly, the SIM can be inserted into a variety of portable devices so that it can use user functions provided by the portable device. The portable device is equipped with a slot into which the SIM is inserted. When the SIM is inserted into the slot, the portable device supplies power to the SIM. The SIM can perform the reset process using the supplied power and transmit and receive various data necessary to use the portable device by communicating with the controller 160. More particularly, the SIM may include information necessary to use a data communication function on the basis of the portable device.

Figure 2:
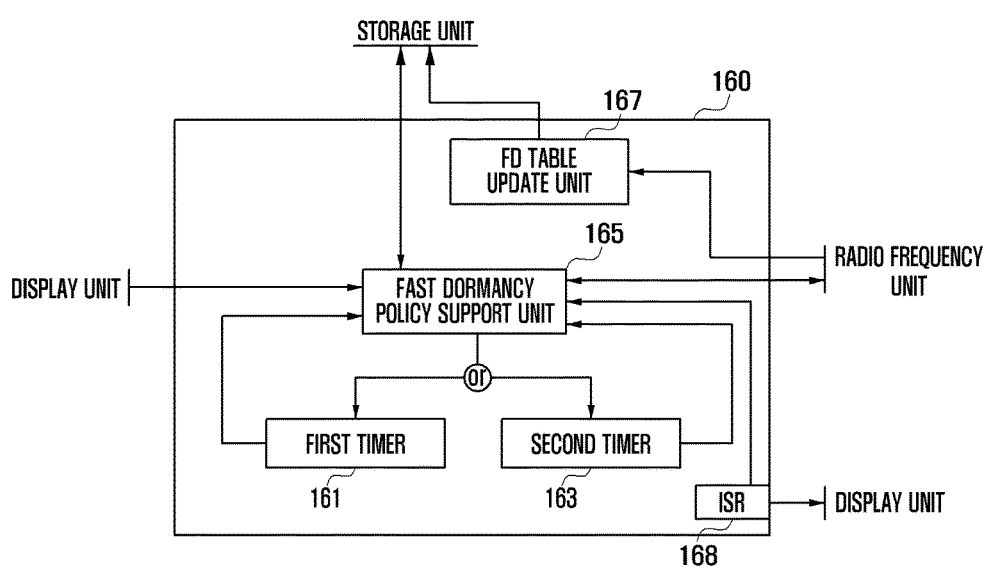
FIG. 2 is a diagram showing a configuration of a controller according to an exemplary embodiment of the present invention.

FIG. 2 is a diagram showing a configuration of a controller according to an exemplary embodiment of the present invention.

Referring to FIG. 2, the controller 160 includes a fast dormancy policy support unit 165, a first timer 161, a second timer 163, an ISR 168, and an FD table update unit 167.

The ISR 168 is an element for generating a specific signal according to whether power is supplied to the display unit 140. That is, the ISR 168 may generate different signals when the display unit 140 is in the turn-on state and the turn-off state. The ISR 168 can transfer the signal, generated according to a change in the state of the display unit 140, to the fast dormancy policy support unit 165.

The first timer 161 is an element activated when the display unit 140 is in the turn-on state under the control of the fast dormancy policy support unit 165. When the first timer 161 is activated by the fast dormancy policy support unit 165, the first timer 161 performs a countdown for the time-out time for a preset time (e.g., 5 seconds). After the 5 seconds elapse, the first timer 161 provides timer expiration information to the fast dormancy policy support unit 165. In an exemplary implementation, the first timer 161 may be reset before the time-out time expires under the control of the fast dormancy policy support unit 165.

Like the first timer 161, the second timer 163 is an element activated when the display unit 140 is in the turn-off state under the control of the fast dormancy policy support unit 165. When the second timer 163 is activated by the fast dormancy policy support unit 165, the second timer 163 performs a countdown for the time-out time for a preset time (e.g., 2 seconds). After the 2 seconds elapse, the second timer 163 provides timer expiration information to the fast dormancy policy support unit 165. Meanwhile, like the first timer 161, the second timer 163 may be reset before the time-out time expires under the control of the fast dormancy policy support unit 165. The second timer 163 may be set to have a relatively shorter time-out time than the first timer 161.

The fast dormancy policy support unit 165 can drive the first timer 161 with reference to the FD table 151 stored in the storage unit 150 during the time for which the display unit 140 is in the turn-on state. That is, the fast dormancy policy support unit 165 drives the first timer 161 with reference to fast dormancy setting information corresponding to first data communication setting information which has been set to be applied when the display unit 140 is in the turn-on state. Furthermore, if data transmission or data reception, or both are generated before a time-out expires while the first timer 161 is driven, the fast dormancy policy support unit 165 may control the first timer 161 so that the first timer 161 is reset. Meanwhile, when the timer expiration information is received from the first timer 161, the fast dormancy policy support unit 165 may perform control so that RRC release for a specific user function operated based on a communication function is performed.

Furthermore, the fast dormancy policy support unit 165 can drive the second timer 163 with reference to fast dormancy setting information corresponding to second data communication setting information which has been set to be applied when the display unit 140 is in the turn-off state during the time for which the display unit 140 is in the turn-off state from the FD table 151. In this process, as in the operation of the first timer 161, when data transmission or data reception, or both are generated before the second timer 163 expires, the fast dormancy policy support unit 165 may perform control so that the second timer 163 is reset. When a countdown is finished without additional data transmission or reception, the fast dormancy policy support unit 165 may perform control so that RRC release is performed.

Meanwhile, if the display unit 140 maintains the turn-on state, it may indicate a high probability that a user may operate a specific user function using the portable device. For this reason, during the time for which the display unit 140 maintains the turn-on state, the time for which RRC release is performed is set to be long. In other words, an unnecessary RRC release or an RRC release that is not desired by a user is prevented by a timer in which the time-out time is set to be relatively long. If the display unit 140 is in the turn-off state, the time for which RRC release is performed is set to be relatively short by a timer in which the time-out time is set to be relatively short. Accordingly, the state in which unnecessary resources are used can be released, thereby optimizing power consumption for maintaining resources. Although the fast dormancy policy support unit 165 has been illustrated to select the first timer 161 and the second timer 163, the first timer 161 and the second timer 163 may be replaced by setting the time-out time according to relevant data communication setting information on the basis of one of the first timer 161 and the second timer 163.

The controller 160 may further include the FD table update unit 167. The FD table update unit 167 is an element for controlling the update of the FD table 151 which is stored in the data region of the storage unit 150. The data communication setting information stored in the FD table 151 may be changed according to a change in the policy of each service provider supporting a mobile communication service or the data communication setting of a specific user function. That is, if the policy of a service provider is changed, a fast dormancy setting applied to a relevant service provider network may be removed or a parameter value for a fast dormancy setting may be changed. Furthermore, the timer time in the turn-on state or the turn-off state of the display unit 140 may be changed at the request of a service provider. Accordingly, when a new FD table for updating the existing FD table 151 is received from a specific portable device or the management server of the portable device, the FD table update unit 167 may update the existing FD table 151 with the new FD table.

The number of timers operated by the fast dormancy policy support unit 165 has been illustrated to be two, but the present invention is not limited thereto. That is, since the time-out amount of the timer may be controlled by the fast dormancy policy support unit 165, the time-out time of the timer may be controlled according to the state of the display unit 140 as described above. For example, if the controller 160 has one timer and the display unit 140 is in the turn-on state, the time-out time of the timer may be controlled so that it is set to a first time. If the display unit 140 is in the turn-off state, the time-out time of the timer may be controlled so that it is set to a second time. Accordingly, the controller 160 can determine the RRC release time according to the state of the display unit 140 on the basis of the one timer. Here, the first time may be set to be relatively longer than the second time. For example, if the first time is set to 5 seconds, the second time may be set to 2 seconds.

As described above, the portable device, according to exemplary embodiments of the present invention, differently supports pieces of data communication setting according to the state of the display unit 140. Accordingly, power consumption necessary to maintain RRC can be optimized, and a suitable data communication setting can be supported according to the state in which a user uses the portable device.

The elements of the portable device and the role and function of each of the elements according to an exemplary embodiment of the present invention have been described above. Hereinafter, an exemplary operation method, more particularly, a power supply control method, is described in more detail with reference to the following flowchart on the basis of the portable device.

Figure 3:
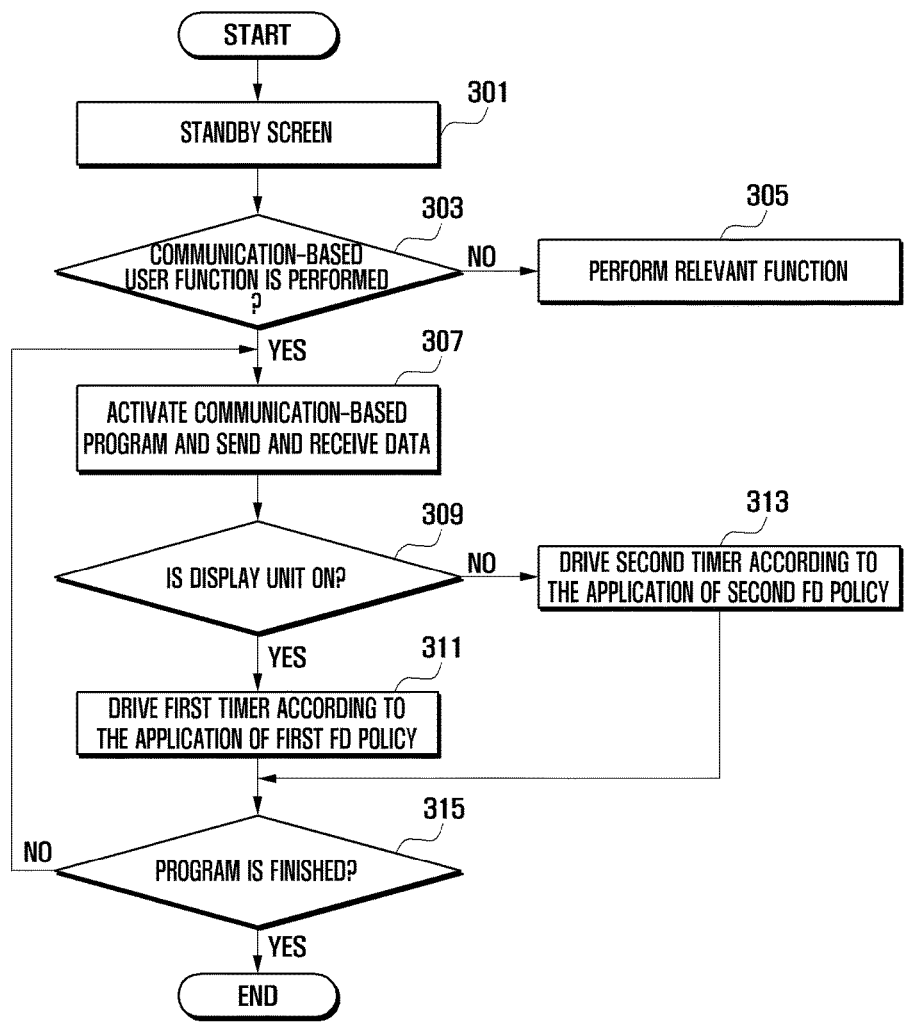
FIG. 3 is a flowchart illustrating a method of operating a portable device for performing adaptive data communication control according to an exemplary embodiment of the present invention.

FIG. 3 is a flowchart illustrating a method of operating a portable device for performing adaptive data communication control according to an exemplary embodiment of the present invention.

Referring to FIG. 3, a user may perform an operation for supplying power to the portable device. In order to supply power, the user may connect the portable device to a battery or a charger and generate an input signal for supplying power. When power is supplied, the portable device distributes the power as necessary to operate each of the elements of the portable device using the supplied power, resets each of the elements using the generated power, and performs booting. When the booting process is finished, the portable device may perform control based on preset schedule information so that a standby screen is output to the display unit 140 in step 301.

The controller 160 determines whether an input signal for performing a communication-based user function is generated in step 303. If it is determined that the input signal for performing the communication-based user function is not generated, the controller 160 controls to perform a specific user function in response to a relevant input signal in step 305. For example, the controller 160 may control to perform a file search function, a file play function, a camera function, and the like, which are stored in the storage unit 150 in response to input signals generated at step 305. Furthermore, the controller 160 controls to perform a call function not requiring RRC release.

However, if it is determined in step 303 that the input signal for performing the communication-based user function is generated, the controller 160 of the portable device may control so that a communication-based program corresponding to the generated input signal is activated in step 307. Furthermore, the controller 160 may support the transmission and reception of data when the communication-based program is activated. When the communication-based program is activated, more particularly, when a data communication-based program is activated, the controller 160 can perform access to a specific server over a service provider network using the radio frequency unit 110. In this process, an RRC setting is maintained. The specific server may be a server providing a web service, a server providing an instant message service, and the like.

When a data communication function is activated, the controller 160 of the portable device may determine the state of the display unit 140 in step 309. That is, the controller 160 may determine whether the state of the portable device is in the turn-on state or the turn-off state. The display unit 140, at a point of time when the portable device activates the data communication function, will maintain the turn-on state. Although the data communication function is activated, the state of the display unit 140 may shift to the turn-off state according to a point of time when a user generates an input signal. That is, the display unit 140 may shift to the turn-off state after a lapse of a certain time in the state in which the data communication function is activated. Accordingly, the controller 160 of the portable device may control to proceed to step 311 or 313 by determining the state of the display unit 140 at step 309.

In more detail, if it is determined in step 309 that the state of the display unit 140 is the turn-on state, the controller 160 of the portable device controls the application of a first FD policy in step 311. The first FD policy is information for data communication setting which is applied when the display unit 140 is in the turn-on state. The first FD policy can be determined with reference to the FD Table 151 stored in the storage unit 150. The controller 160 of the portable device checks the FD Table 151 stored in the storage unit 150 and determines a fast dormancy policy, written in the first FD policy, in the FD Table 151. Furthermore, the controller 160 may activate the first timer 161 according to the fast dormancy policy corresponding to the first FD policy. Meanwhile, if the controller 160 has one timer and the time-out time of the timer is set to be controlled according to a fast dormancy policy, the controller 160 may perform control so that the time-out time of the timer is controlled according to the first FD policy. Furthermore, the controller 160 determines whether the first timer 161 has expired. When data transmission or data reception, or both are generated before the first timer 161 expires, the controller 160 performs control so that the first timer 161 is reset. When the first timer 161 expires, the controller 160 may perform control so that RRC release for the communication-based user function being activated is performed.

Meanwhile, if, as a result of the determination at step 309, the display unit 140 is in the turn-off state, the controller 160 controls the application of a second FD policy in step 313. The second FD policy is information of a data communication setting which is applied when the display unit 140 is in the turn-off state. The controller 160 may determine a fast dormancy policy corresponding to the second FD policy with reference to the FD Table 151 stored in the storage unit 150 and perform control so that the second timer 163 is activated based on the determined fast dormancy policy. If one timer exists and the time-out time of the timer is set to be controlled according to a fast dormancy policy, the controller 160 may perform control so that the time-out time of the timer is controlled according to the second FD policy. Furthermore, the controller 160 may determine whether the second timer 163 expires. When data transmission or data reception, or both are generated before the second timer 163 expires, the controller 160 performs control so that the second timer 163 is reset. When the second timer 163 is finished, the controller 160 may perform control so that RRC release for the communication-based user function being activated is performed. Here, the time-out time of the first timer 161 according to the first FD policy may be set to be relatively longer than the time-out time of the second timer 163.

The controller 160 determines whether the program is finished in step 315. If it is determined that the program is finished, the controller 160 may end the process or return to step 301. On the other hand, if, as a result of the determination at step 315, an additional input signal for finishing the program is not generated, the controller 160 may proceed to step 307 and control to repeatedly perform subsequent steps.

In addition, the controller 160 may further perform a process of updating the FD Table 151 stored in the storage unit 150. The process of updating the FD Table 151 may include a process of updating the FD Table 151, stored in the storage unit 150, into a new FD Table, if the new FD Table is supplied through the radio frequency unit 110 or through a wired/wireless communication interface supported by another portable device. The update of the FD Table 151 can satisfy a change of a variety of policies provided by service providers, the development of a new data communication program, and control of a relevant network environment.

As described above, in a method of operating the portable device for performing adaptive data communication setting control according to an exemplary embodiment of the present invention, whether a fast dormancy policy will be applied and the RRC release time are controlled according to the turn-on state or the turn-off state of the display unit 140. Accordingly, power can be reduced more efficiently, and an effective data communication setting environment can be supported.

Meanwhile, the portable device may further include elements not described above, such as a near field communication module for near field communication, a camera module for photographing still images and moving images of a subject as described above, an interface for enabling the portable device to send and receive data according to a wired communication method or a wireless communication method, an Internet communication module for performing an Internet function over an Internet network, and a digital broadcasting module for performing a function of receiving and playing digital broadcasting. The elements may not be all enumerated because they are modified in various ways according to the convergence trend of digital devices, but elements equivalent to the above-described elements may be further added to the terminal. Furthermore, it is to be noted that the portable device may omit some of the elements from the configuration or may replace some of the elements with other elements. This may be easily understood by a person having ordinary skill in the art.

Furthermore, the portable device may include all types of devices for supporting a data communication function on the basis of a base station, including the SIM. For example, the mobile terminal may include all mobile communication terminals which are operated in accordance with communication protocols corresponding to various communication systems, all information communication devices and multimedia devices, such as a Portable Multimedia Player (PMP), a digital broadcasting player, a Personal Digital Assistant (PDA), a music player (e.g., an MP3 player), a handheld game terminal, a smart phone, a notebook computer, and a handheld Personal Computer (PC), and application devices for the information communication devices and multimedia devices. Furthermore, the portable device according to an exemplary embodiment of the present invention is a portable device having the display unit. It is evident that the portable device may be applied to all information communication devices and multimedia devices, such as portable devices supporting International Mobile Telecommunication 2000 (IMT-2000), Time Division Multiple Access (TDMA), Global System for Mobile Communication (GSM), Code Division Multiple Access (CDMA), Universal Mobile Telecommunication Service (UMTS), and Wideband Code Division Multiple Access (WCDMA) according to their communication support schemes, and application thereof.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method comprising:
    determining, by a controller of an electronic device, whether a display unit operatively coupled to the electronic device is in a first state or a second state;
    extracting information on one of a first fast dormancy policy and a second fast dormancy policy based on the determined state;
    setting, by the controller, a first period of time as a duration for network resources to fall into dormancy, the setting of the first period of time based on the first fast dormancy policy and a determination that the display unit is in the first state; and
    setting, by the controller, a second period of time as the duration for the network resources to fall into the dormancy, the setting of the second period of time based on the second fast dormancy policy and a determination that the display unit is in the second state,
    wherein the first period of time is longer than the second period of time,
    wherein the first state is an on state of the display and the second state is an off state of the display, and
    wherein at least one of the first period of time or the second period of time is to be loaded from a portable terminal external to the electronic device via a communication channel previously established between the electronic device and the portable terminal.

2. The method of claim 1, wherein the electronic device is configured to consume more power in the first state than in the second state.

3. The method of claim 2, further comprising:
    maintaining the first state for the display unit based at least in part on a determination that an input is received at the electronic device during a specified period of time.

4. The method of claim 2, further comprising:
    transitioning the electronic device from the first state to the second state based at least in part on a determination that execution of an application or a function thereof using the network resources is terminated.

5. The method of claim 1, wherein at least one of the first period of time or the second period of time is to be loaded from a storage unit operatively coupled to the electronic device.

6. The method of claim 1, further comprising:
    releasing one or more resources associated with a communication channel previously established between the electronic device and another electronic device external to the electronic device, the releasing based at least in part on expiration of a corresponding one of the first period of time or the second period of time.

7. The method of claim 6, wherein the releasing comprises:
    transmitting a request to release the one or more resources from the controller to the communication unit.

8. An apparatus comprising:
    a display configured to operate in a first state or a second state; and
    at least one processor operatively coupled to the display unit, the at least one processor configured to:
        determine whether the display unit is in the first state or the second state,
        extract information on one of a first fast dormancy policy and a second fast dormancy policy based on the determined state,
        set a first period of time as a duration for network resources to fall into dormancy, the setting of the first period of time based on the first fast dormancy policy and a determination that the display unit is in the first state, and
        set a second period of time as the duration for the network resources to fall into the dormancy, the setting of the second period of time based on the second fast dormancy policy and a determination that the display unit is in the second state,
    wherein the first period of time is longer than the second period of time,
    wherein the first state is an on state of the display and the second state is an off state of the display, and
    wherein at least one of the first period of time or the second period of time is to be loaded from a portable terminal external to the apparatus via a communication channel previously established between the apparatus and the portable terminal.

9. The apparatus of claim 8, wherein the apparatus is configured to consume more power in the first state than in the second state.

10. The apparatus of claim 9, wherein the at least one processor is further configured to:
    maintain the first state for the display unit based at least in part on a determination that an input is received at the apparatus during a specified period of time.

11. The apparatus of claim 9, wherein the at least one processor is further configured to:
    transition the apparatus from the first state to the second state based at least in part on a determination that an application or a function thereof using the network resources is terminated.

12. The apparatus of claim 8, wherein the at least one processor is further configured to:
    release one or more resources associated with a communication channel previously established between the apparatus and an electronic device external to the apparatus, the releasing based at least in part on expiration of a corresponding one of the first period of time or the second period of time.

13. The apparatus of claim 12, wherein the at least one processor is further configured to:
    transmit a request to release the one or more resources to the communication unit.

14. The apparatus of claim 12, further comprising a transceiver configured to:
    consume lower power when the one or more resources are released than when the one or more resources are maintained.

15. The apparatus of claim 8, wherein the at least one processor is further configured to:
    change a corresponding one of the first period of time or the second period of time based at least in part on a determination that at least one of data transmission or data reception occurs at the network resources before the corresponding period of time expires.

16. A non-transitory machine-readable storage device storing instructions that, when executed by one or more processors, cause the one or more processors to perform operations comprising:
    determining, by a controller of an electronic device, whether a display unit operatively coupled to the electronic device is in a first state or a second state;
    extracting information on one of a first fast dormancy policy and a second fast dormancy policy based on the determined state;
    setting, by the controller, a first period of time as a duration for network resources to fall into dormancy, the setting of the first period of time based on the first fast dormancy policy and a determination that the display unit is in the first state; and
    setting, by the controller, a second period of time as the duration for the network resources to fall into the dormancy, the setting of the second period of time based on the second fast dormancy policy and a determination that the display unit is in the second state,
    wherein the first period of time is longer than the second period of time,
    wherein the first state is an on state of the display and the second state is an off state of the display, and
    wherein at least one of the first period of time or the second period of time is to be loaded from a portable terminal external to the electronic device via a communication channel previously established between the electronic device and the portable terminal.

* * * * *